US005939968A

United States Patent [19]

Nguyen et al.

[11] Patent Number: 5,939,968

[45] Date of Patent: Aug. 17, 1999

[54] ELECTRICAL APPARATUS FOR OVERCURRENT PROTECTION OF ELECTRICAL CIRCUITS

[75] Inventors: Thinh Nguyen, Chicago; Anthony Minervini, Orland Park, both of Ill.

[73] Assignee: Littelfuse, Inc., Des Plaines, Ill.

[21] Appl. No.: 09/153,688

[22] Filed: Sep. 15, 1998

Related U.S. Application Data

[63] Continuation-in-part of application No. 08/667,955, Jun. 19, 1996, Pat. No. 5,808,538.

[51] Int. Cl.[6] .............................. H02H 5/04; H02H 9/00; H01C 7/02

[52] U.S. Cl. .............................. 337/12; 337/158; 337/14; 337/137; 337/140; 338/22 R; 361/58; 361/106

[58] Field of Search ............................... 337/12, 14, 137, 337/140, 158, 123, 139; 338/22 R; 361/58, 106

[56] References Cited

U.S. PATENT DOCUMENTS

| | | | |
|---|---|---|---|
| 3,750,082 | 7/1973 | Petersen et al. | 338/220 |
| 4,418,272 | 11/1983 | Roller et al. | 219/541 |
| 4,698,614 | 10/1987 | Welch et al. | 338/22 R |
| 4,939,498 | 7/1990 | Yamada et al. | 338/22 R |
| 5,142,265 | 8/1992 | Motoyoshi et al. | 338/22 R |
| 5,153,555 | 10/1992 | Enomoto et al. | 338/22 R |
| 5,233,326 | 8/1993 | Motoyoshi | 338/22 R |
| 5,382,938 | 1/1995 | Hansson et al. | 338/22 R |
| 5,451,921 | 9/1995 | Crawford et al. | 338/220 |

FOREIGN PATENT DOCUMENTS

| | | |
|---|---|---|
| 0 304196 A2 | 2/1989 | European Pat. Off. . |
| 0 489538 A1 | 6/1992 | European Pat. Off. . |
| 0 554459 A1 | 8/1993 | European Pat. Off. . |
| 2 064928 | 6/1981 | United Kingdom . |
| WO 94/06218 | 3/1994 | WIPO . |
| WO 95/10115 | 4/1995 | WIPO . |

*Primary Examiner*—Leo P. Picard
*Assistant Examiner*—Anatoly Vortman
*Attorney, Agent, or Firm*—Wallenstein & Wagner, Ltd

[57] ABSTRACT

An electrical apparatus comprising first and second PTC elements composed of a polymer composition with conductive particles dispersed therein, an insulating body, and first and second conductive terminals. Flexible conductive members having a first end that can be electrically connected to a source of electrical power and a second end that is adapted to receive and make electrical contact with the apparatus are provided. The PTC element and the insulating body are positioned between the first and second conductive terminals so that when the apparatus is inserted between the flexible conductive members, the members exert a pressure on the insulating body.

15 Claims, 10 Drawing Sheets

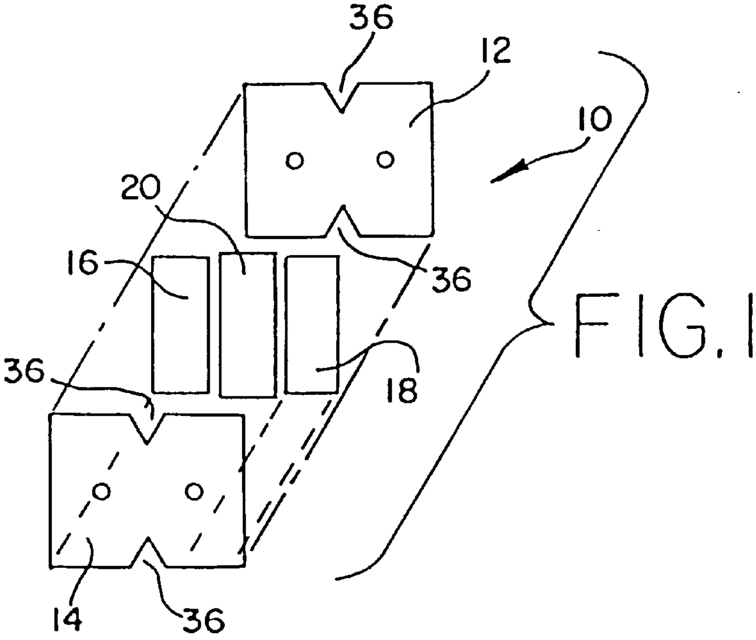
FIG. 1
FIG. 2
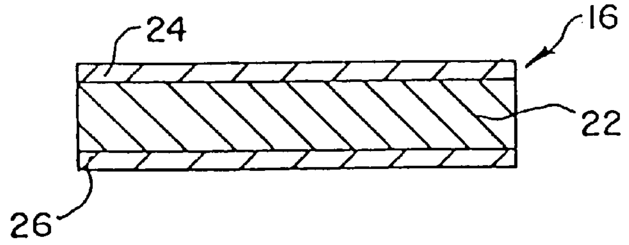
FIG. 3
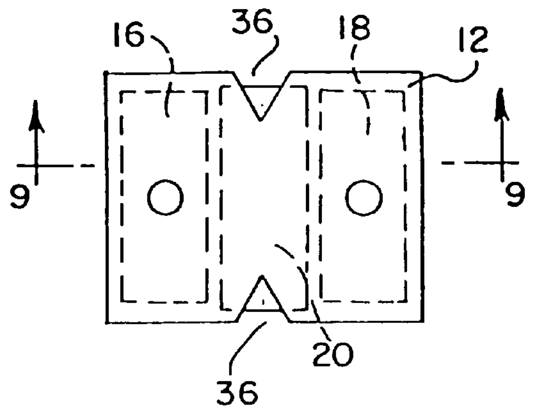
FIG. 4
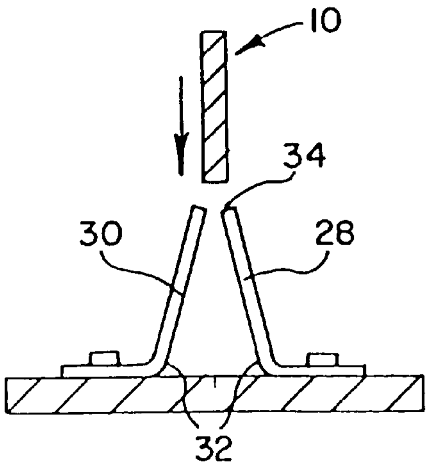

FIG. 15
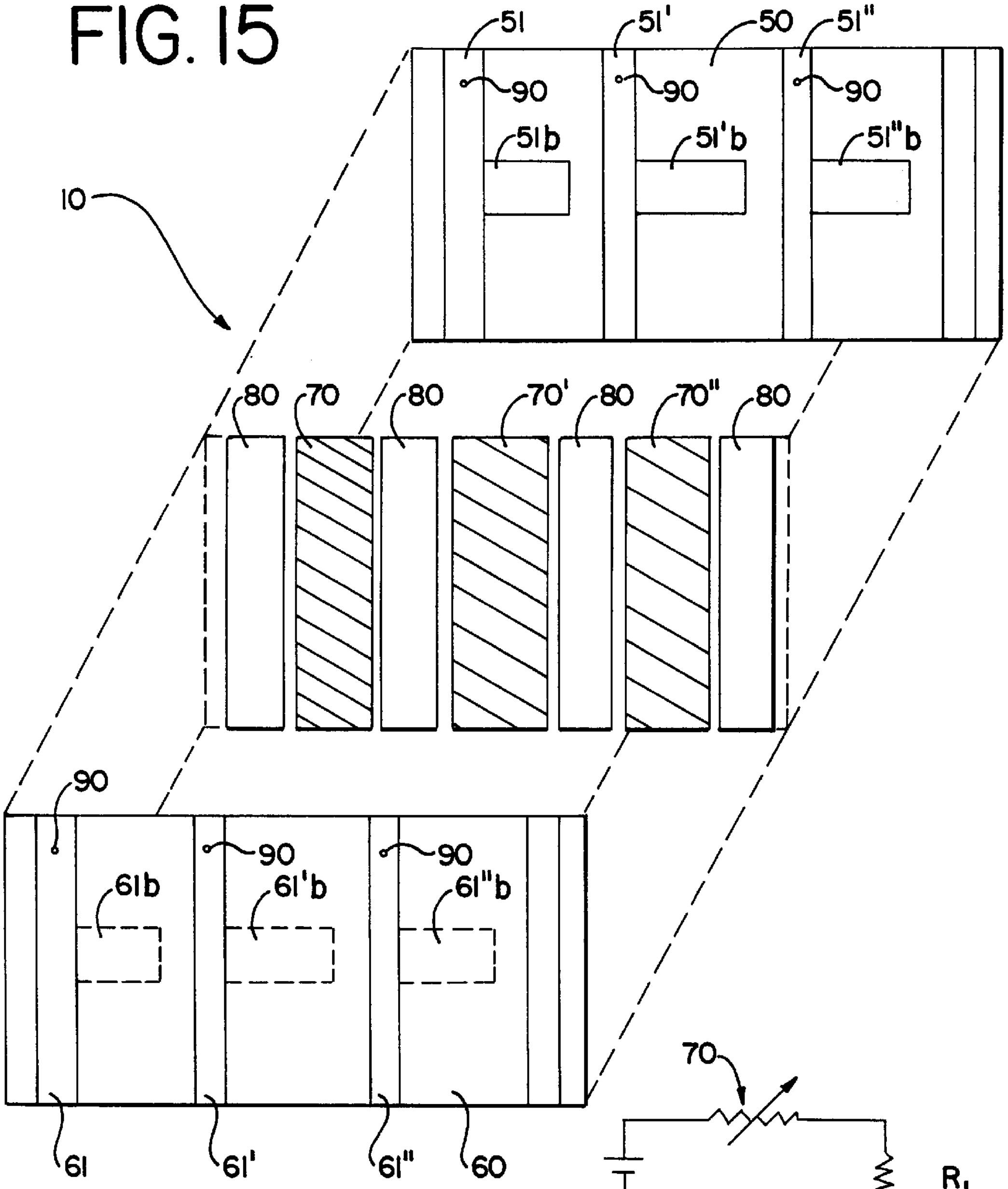
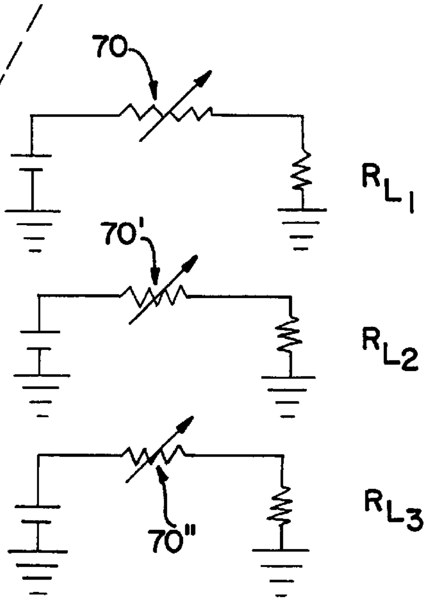
FIG.15A

FIG. 18
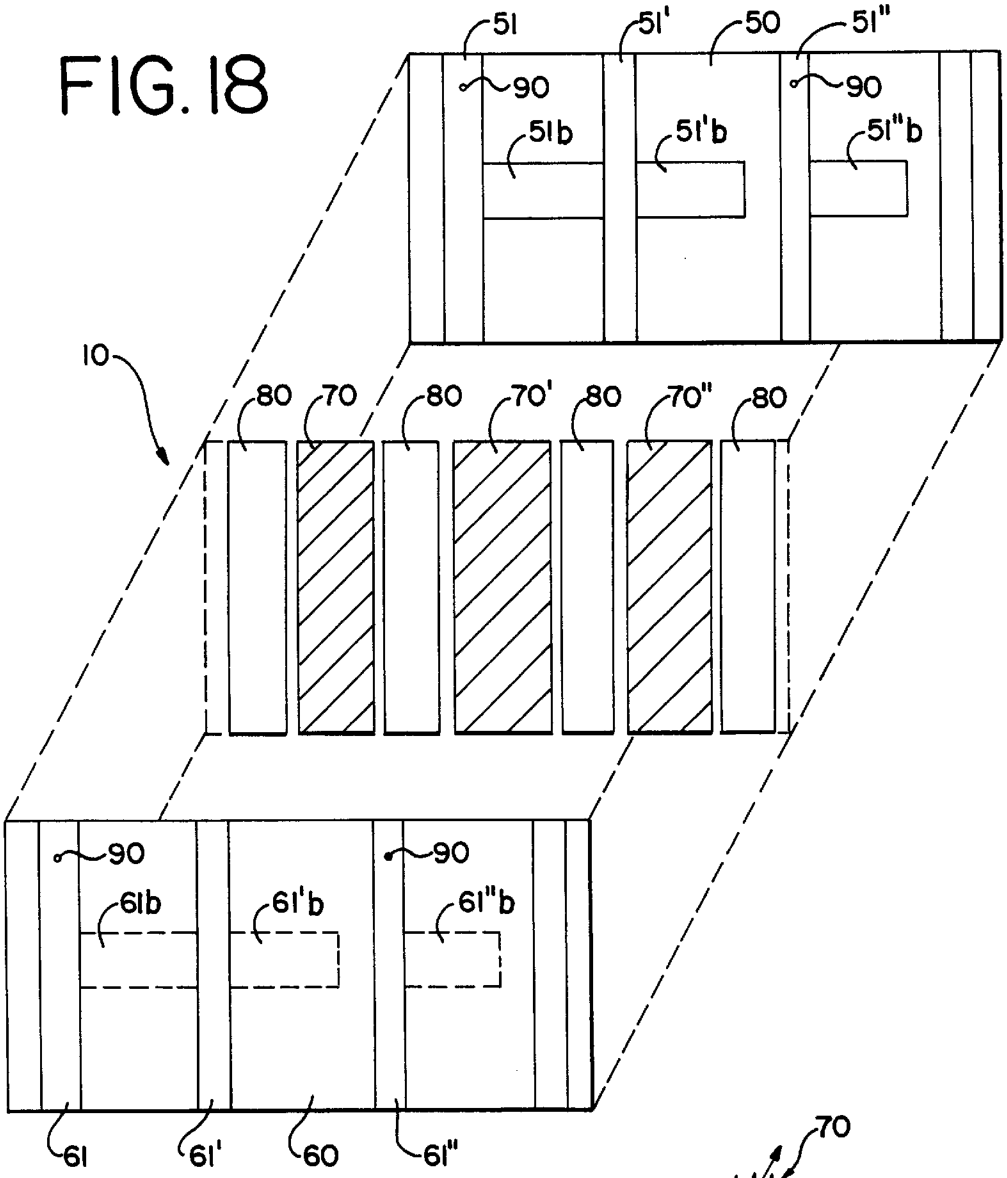
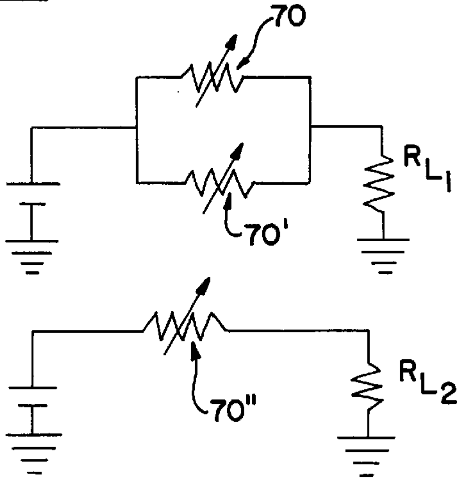
FIG. 18A

ELECTRICAL APPARATUS FOR OVERCURRENT PROTECTION OF ELECTRICAL CIRCUITS

RELATED APPLICATIONS

This application is a continuation-in-part of U.S. patent application No. 08/667,955, filed Jun. 19, 1996, now U.S. Pat. No. 5,808,538.

DESCRIPTION

1. Technical Field

The present invention relates generally to an electrical apparatus having a positive temperature coefficient (PTC) element for overcurrent protection of an electrical circuit.

2. Background Of The Invention

It is well known that the resistivity of many conductive materials change with temperature. Resistivity of a PTC conductive material increases as the temperature of the material increases. Many crystalline polymers, made electrically conductive by dispersing conductive fillers therein, exhibit this PTC effect. These polymers generally include polyolefins such as polyethylene, polypropylene and ethylene/propylene copolymers. At temperatures below a certain value, i.e., the critical or trip temperature, the polymer exhibits a relatively low, constant resistivity. However, as the temperature of the polymer increases beyond the critical point, the resistivity of the polymer sharply increases.

Polymer PTC materials have been used in electrical circuit protection devices to provide overcurrent protection to electrical components of a circuit. Under normal operating conditions in the electrical circuit, relatively little current flows through the PTC device. Thus, the temperature of the device (due to internal $I^2R$ heating) remains below the critical or trip temperature. If a resistive load in the circuit is shorted or if the circuit experiences a power surge, the current flowing through the PTC device increases and its temperature (due to internal $I^2R$ heating) rises rapidly to its critical temperature. As a result, the resistance of the PTC device greatly increases, effectively limiting the current flow in the circuit to a fraction of its original value. This negligible current value is enough to maintain the PTC device at a new, high temperature/high resistance equilibrium state, and will not damage the electrical components of the circuit.

The PTC device acts as a form of a fuse, reducing the current flow through the short circuit load to a safe, low value when the PTC device is heated to its critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

Conventional polymer PTC electrical devices include a polymer PTC composition interposed between first and second electrodes. Conductive terminals are electrically connected to the first and second electrodes. The terminals can take a variety of geometric configurations (e.g., planar, columnar). In turn, the terminals can be electrically connected to additional electrical components, and ultimately to a source of electrical power.

The terminals of prior PTC devices have been designed to be soldered to conductive pads on a printed circuit board, physically strapped to the electrical component it is protecting, and to make electrical contact between two flexible conductive members.

In this last design, electrical contact is maintained by a pressure exerted on the PTC device by the flexible conductive members. This pressure, however, interferes with the electrical performance of the device. Consequently, prior PTC electrical devices of this type have been unreliable.

SUMMARY OF THE INVENTION

It is an object of the present invention to provide an electrical apparatus comprising a polymer PTC element which can be inserted between, and make electrical contact with, flexible conductive members without altering the electrical performance of the polymer PTC element. The result is a reliable circuit protection device that can be easily and economically incorporated into numerous electrical systems.

It is another object of the present invention to provide an electrical apparatus where multiple PTC elements can be electrically connected in parallel to increase the current carrying capacity of the apparatus.

It is a further object of the present invention to provide a single electrical apparatus that includes a plurality of PTC devices, each device designed to provide overcurrent protection to a separate electrical circuit.

In accordance with a first aspect of the present invention, there is provided an electrical circuit protection device for making an electrical connection between flexible conductive members. The device comprises: (a) a first conductive terminal disposed on a first electrically insulating substrate; (b) a second conductive terminal disposed on a second electrically insulating substrate; (c) a PTC element disposed between the first and second substrates and electrically connecting the first conductive terminal to the second conductive terminal; and (d) an insulating body disposed between the first and second substrates and positioned such that when the device is electrically connected between the flexible conductive members, the flexible members exert a force upon the insulating body.

In a second aspect of the present invention, the electrical circuit protection device comprises first and second electrically insulating substrates. The first substrate has a plurality of first conductive terminals disposed thereon. The second substrate has a corresponding plurality of second conductive terminals disposed thereon. A plurality of PTC elements are positioned between the first and second substrates, each PTC element being electrically connected to a first and a second conductive terminal. A plurality of insulating bodies is disposed between the substrates and positioned such that when the device is electrically connected between the flexible conductive members, the flexible members exert a force upon at least one of the plurality of insulating bodies. Two or more of the plurality of PTC elements may be electrically connected in parallel to increase the current carrying capacity of the device.

In accordance with a third aspect of the present invention, the electrical circuit protection device comprises a first electrically insulating substrate having a plurality of first conductive terminals disposed thereon and a second electrically insulating substrate having a plurality of second conductive terminals disposed thereon. A portion of each first conductive terminal defines a fusible element. A plurality of PTC elements is disposed between the insulating substrates. Each PTC element is composed of a conductive polymer composition and is electrically connected to one of the plurality of first conductive terminals and to one of the plurality of second conductive terminals such that each PTC element is electrically connected in series with the portion of each first conductive terminal defining a fusible element, respectively. A plurality of insulating bodies is also disposed between the first and second substrates and positioned such that when the device is electrically connected between the flexible conductive members, the flexible members exert a force upon at least one of the plurality of insulating bodies.

BRIEF DESCRIPTION OF THE DRAWINGS

In order that the present invention may be understood, it will now be described by way of example, with reference to the accompanying drawings in which:

FIG. 1 is an exploded perspective view of one embodiment of an electrical apparatus according to the present invention;

FIG. 2 is a front view of a preferred embodiment of a PTC element according to the present invention;

FIG. 3 is a plan view of the electrical apparatus illustrated in FIG. 1;

FIG. 4 is a side view of one embodiment of an electrical assembly according to the present invention;

FIG. 15 is an exploded perspective view of the electrical circuit protection device illustrated in FIGS. 13–14.

FIG. 15A is a electrical schematic diagram of the device illustrated in FIG. 15.

FIG. 18 is an exploded perspective view of an electrical circuit protection device according to a second embodiment of the present invention.

FIG. 18A is a electrical schematic diagram of the device illustrated in FIG. 18.

DETAILED DESCRIPTION OF THE PREFERRED EMBODIMENT

Figure 5:
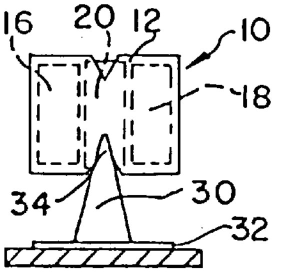
FIG. 5 is a front view of the electrical assembly illustrated in FIG. 4 with the PTC device inserted between the flexible conductive members.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

The electrical apparatus of a first embodiment of the present invention, generally designated by reference numeral 10, is shown in FIG. 1. The electrical apparatus comprises first 12 and second 14 conductive terminals, first 16 and second 18 PTC elements, and an insulating body 20. The first 16 and second 18 PTC elements are in electrical contact with the first 12 and second 14 conductive terminals. The insulating body 20 is positioned adjacent to, and electrically separates, the first 16 and second 18 PTC elements. Consequently, the PTC elements 16, 18 are electrically connected in parallel.

A preferred embodiment of PTC elements 16, 18 is illustrated in FIG. 2. The PTC element 16 comprises a PTC composition 22 electrically connected to a first 24 and second 26 electrode. A variety of PTC materials are suitable for use in the present invention. For example doped ceramics such as barium titanate or strontium titanate can be used. Preferably, however, the PTC composition 22 comprises a crystalline polymer having conductive particles dispersed therein. Generally the polymer will comprise a polyolefin selected from the group consisting of polyethylene, polypropylene, copolymers of polyethylene and ethylene/propylene copolymers. Preferably, the conductive particles comprise carbon black.

Suitable PTC compositions and PTC elements will generally have a resistivity at approximately 25° C. of less than 5 ohm cm, preferably less than 2 ohm cm, especially less than 1 ohm cm. Examples of such PTC compositions and PTC elements are disclosed in U.S. patent application Ser. Nos. 08/437,966 (filed May 10, 1995) and 08/614,038 (filed Mar. 12, 1996) and U.S. Pat. Nos. 4,237,441, 4,689,475 and 4,800,253. These applications and patents are specifically incorporated herein by reference.

Insulating body 20 can be formed from any dielectric material such as ceramic. In a preferred embodiment, insulating body 20 is formed from a material marketed under the tradename Fyrex Paper and manufactured by Grant Wilson, Inc., Chicago, Ill.

In a preferred embodiment illustrated in FIG. 3, the PTC elements 16, 18 and the insulating body 20 are interposed between the first and second conductive terminals 12, 14. The PTC elements 16, 18 are electrically and physically separated by the insulating body 20. The PTC elements 16, 18 are soldered to the terminals 12, 14 to produce a composite electrical apparatus.

With reference now to FIGS. 4 and 5, the electrical apparatus 10 is ideally suited for making electrical contact between flexible conductive members 28, 30. The flexible conductive members 28, 30 have a first end 32 that can be connected to a source of electrical power and a second end 34 that is adapted to receive and maintain electrical contact with the electrical apparatus 10.

To maintain sufficient electrical contact, the flexible conductive members 28, 30 must apply an equal and opposite force on the apparatus 10. In order to prevent these forces from interfering with the PTC behavior of the PTC elements 16, 18, the apparatus 10 is inserted between the flexible conductive members 28, 30 so that electrical contact is made with portions of the first and second conductive terminals 12, 14 adjacent to the insulating body 20. As a result, the forces from the flexible conductive members 28, 30 are applied to the insulating body 20 not the PTC elements 16, 18. Thus, the PTC composition 22 is free to expand in response to fault conditions (i.e., increased $I^2R$ heating or an increase in ambient temperature) and switch to its high temperature/high resistance state.

The parallel configuration of the PTC elements 16, 18 permits the electrical apparatus 10 to provide protection to circuits with greater electrical currents than a single PTC device placed in series with a resistive load and power source. The rating (i.e., the current carrying capability) of the apparatus 10 can be increased in several ways. First, by increasing the resistance, R, of the PTC elements 16, 18 one can increase the rating of the apparatus. For, example an apparatus 10 having PTC elements 16, 18 with resistances, $R_1$ and $R_2$, that are greater than 10 ohm will have a higher rating than an apparatus having PTC elements 16, 18 with resistances of less than 10 ohm, less than 5 ohm and certainly less than 1 ohm.

In a preferred embodiment, the resistance of the first PTC element $R_1$ will be approximately equal to the resistance of the second PTC element $R_2$. However, the present invention also contemplates applications where $R_1$ is greater than $R_2$ (e.g., $R_1$ is approximately equal to $1.5\times R_2$).

Figure 6:
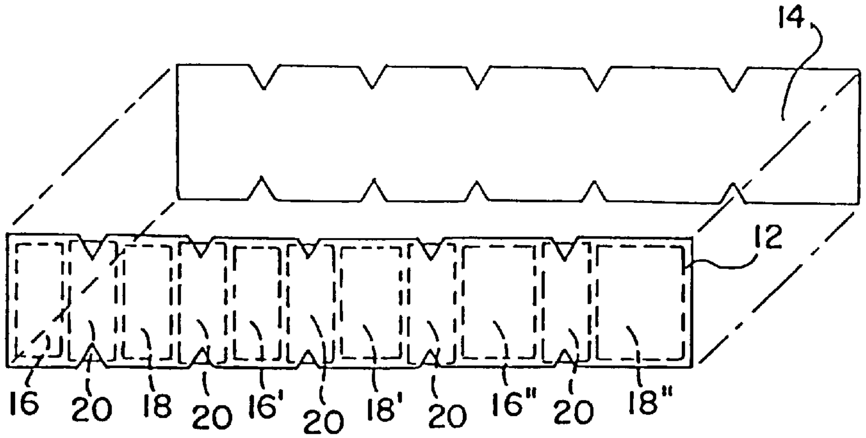
FIG. 6 is a perspective view of another embodiment of the electrical apparatus according to the present invention.

By adding additional PTC elements to the apparatus, the rating of the apparatus may also be increased. Referring now to FIG. 6, according to another embodiment of the invention, the apparatus 10 comprises a plurality of PTC elements 16, 18, 16', 18', 16", 18" in electrical contact with the first 12 and second 14 conductive terminals. A plurality of insulating bodies 20 electrically separate the PTC elements so that the PTC elements are connected electrically in parallel to one another.

Figure 5A:
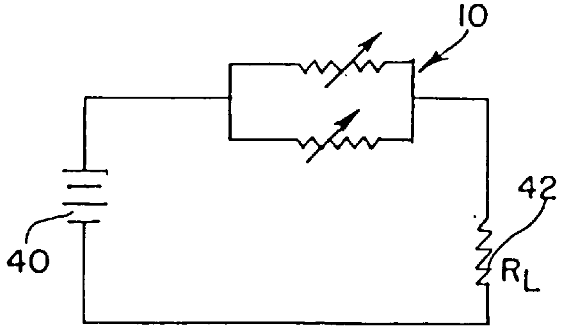
FIG. 5A is a schematic diagram of an electrical circuit comprising the electrical apparatus illustrated in FIGS. 1, 3 and 5.
Figure 6A:
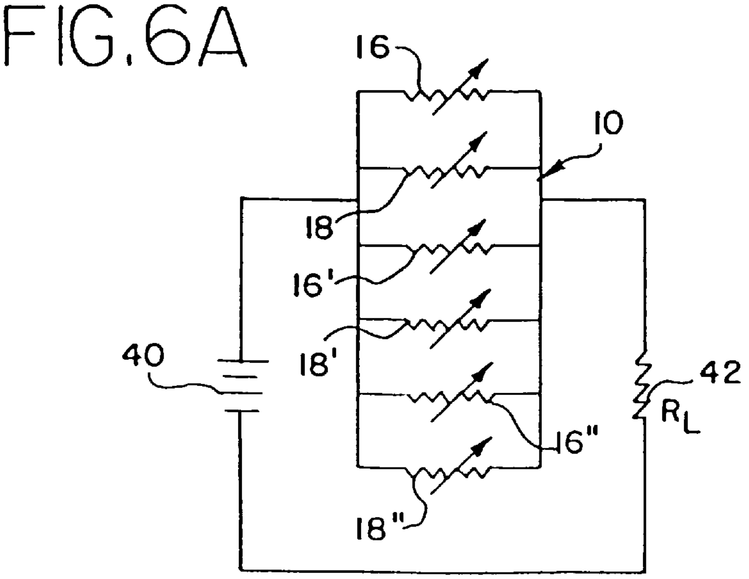
FIG. 6A is a schematic diagram of an electrical circuit comprising the electrical apparatus illustrated in FIG. 6.

FIGS. 5A and 6A schematically illustrate the use of the apparatus 10 illustrated in FIGS. 5 and 6 respectively in an electrical circuit comprising a power source 40 and a resistive load 42.

In a preferred embodiment best illustrated in FIGS. 1, 3 and 5, the periphery of the first conductive terminal 12 and the second conductive terminal 14 have corresponding portions 36 removed. These removed portions 36 help facilitate insertion of the terminals 12, 14 between the flexible conductive members 28, 30. By aligning the insulating body 20 adjacent the removed portions 36, one can assure that when the terminals 12, 14 are inserted between the flexible conductive members 28, 30, the force or pressure exerted by the members will be mainly distributed to the insulating body 20, not the PTC elements 16, 18.

Figure 9:
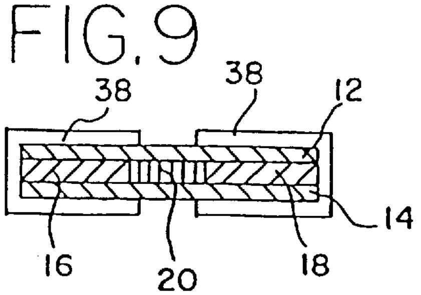
FIG. 9 is a cross-sectional view taken of the apparatus illustrated in FIG. 3 with non-conductive layers applied to the outer surfaces of the terminals.

In yet a more preferred embodiment illustrated in FIG. 9, a non-conductive layer 38 can be applied to the outer surfaces of at least the first conductive terminal 12 adjacent the first 16 and second 18 PTC elements. This design allows electrical contact between the flexible conductive members 28, 30, and the apparatus 10 to take place only adjacent to the insulating body 20. In this manner, the non-conductive layer 38 functions as a guide so that the apparatus 10 cannot be mistakenly inserted between the members 28, 30 such that the pressure or force exerted by the members 28, 30 will interfere with the electrical performance of the PTC elements 16, 18. Preferably, the non-conductive layer 38 is composed of a silicon or epoxy resin.

Figure 7:
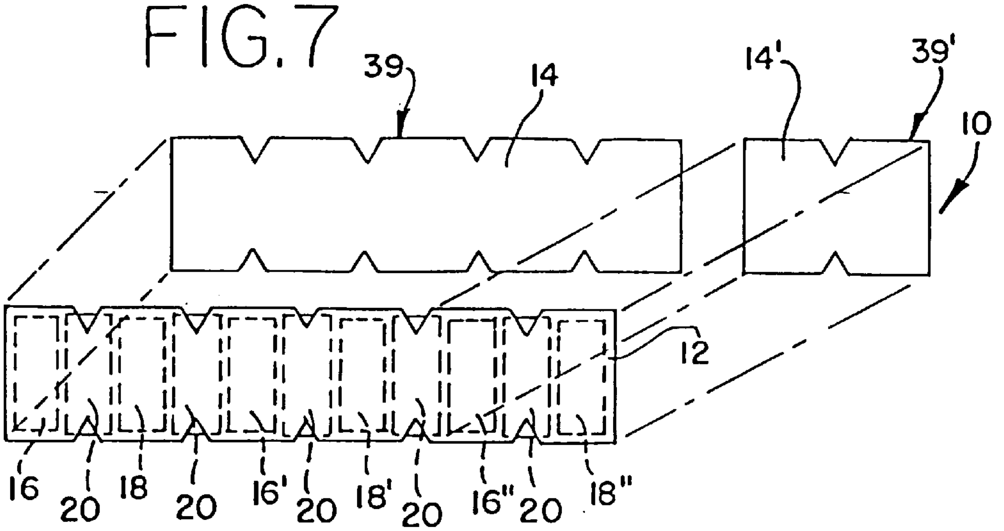
FIG. 7 is a perspective view of a third embodiment of the electrical apparatus according to the present invention.
Figure 8:
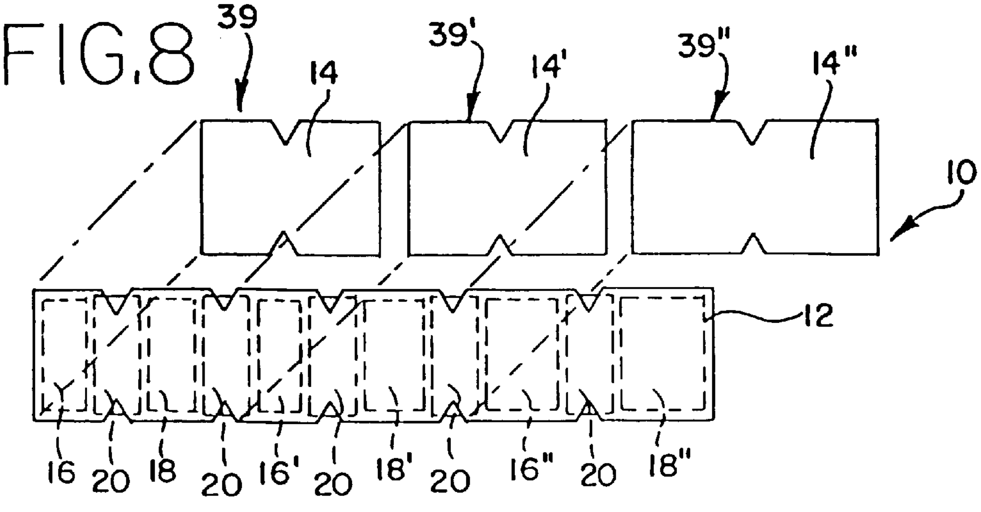
FIG. 8 is a perspective view of a fourth embodiment of the electrical apparatus according to the present invention.

A single electrical apparatus 10 can also provide overcurrent protection to multiple electrical circuits by providing multiple second conductive terminals 14. Referring now to FIGS. 7 and 8, the apparatus 10 comprises a plurality of PTC devices 39, 39', 39", etc. In turn, each device is comprised of PTC elements 16, 18, 16', 18', 16", 18" etc. separated by an insulating body 20, a common first conductive terminal 12, and a second conductive terminal 14, 14', 14" etc. Each PTC element is in electrical contact with the common first conductive terminal 12 but only one of the plurality of second conductive terminals 14, 14', 14", etc. The insulating bodies 20 are positioned adjacent to the PTC elements such that the PTC elements are not in electrical contact with one another. The apparatus 10 in FIG. 7 includes two PTC devices 39, 39' while the apparatus 10 in FIG. 8 includes three PTC devices 39, 39', 39".

It should be understood by those having skill in the art that a single apparatus of the present invention can be used to protect multiple electrical circuits by adding the appropriate number of PTC devices to the apparatus. It should also be understood by those having skill in the art that the rating of the PTC devices can be varied by adding PTC elements or varying the resistivity of the PTC composition. Thus, a single apparatus can protect a number of circuits having different ratings.

Figure 7A:
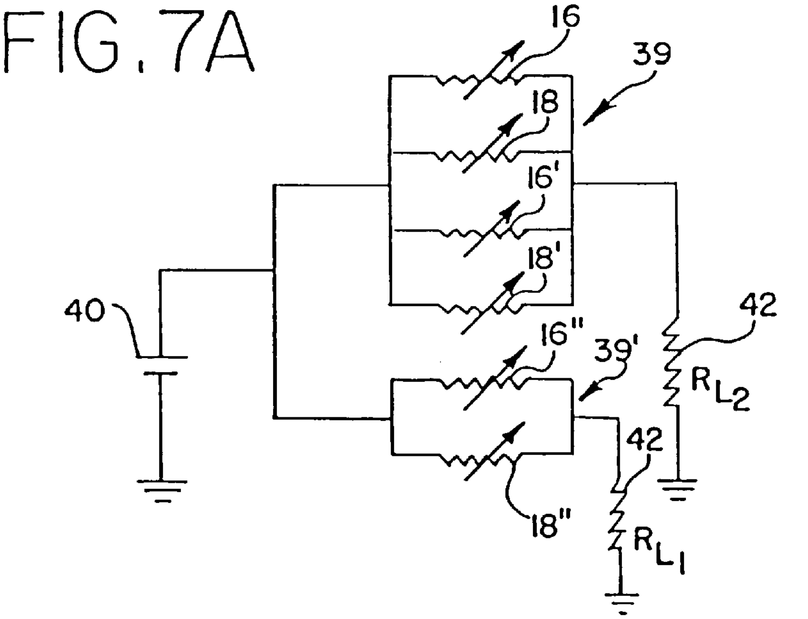
FIG. 7A is a schematic diagram of an electrical circuit comprising the electrical apparatus illustrated in FIG. 7.
Figure 8A:
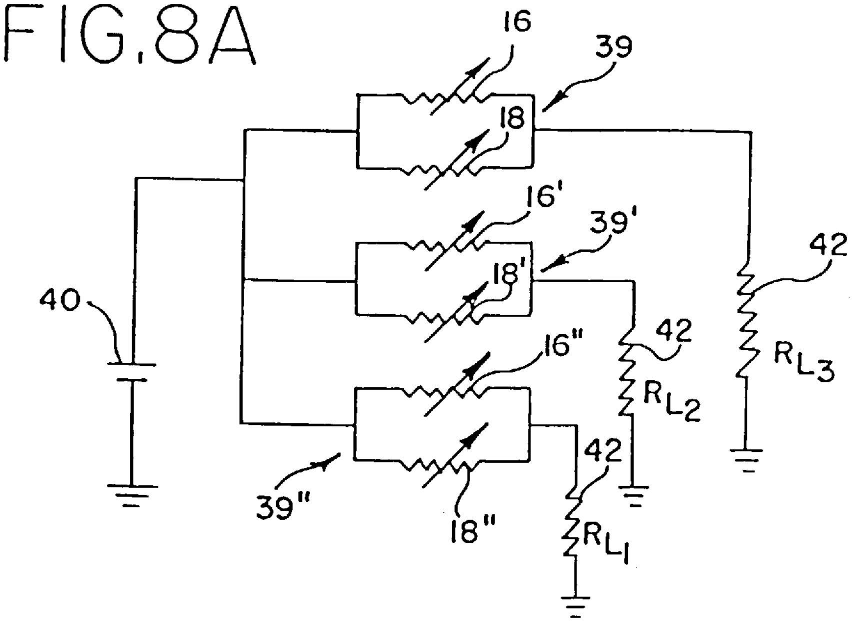
FIG. 8A is a schematic diagram of an electrical circuit comprising the electrical apparatus illustrated in FIG. 8.

FIGS. 7A and 8A schematically illustrate the use of the apparatus 10 illustrated in FIGS. 7 and 8 respectively in an electrical circuit comprising a power source 40 and a resistive load 42. The apparatus 10 illustrated in FIGS. 7 and 7A provides overcurrent protection to two circuits having resistive loads $R_{L1}$ and $R_{L2}$. The apparatus 10 illustrated in FIGS. 8 and 8A provides overcurrent protection to three circuits having resistive loads $R_{L1}$, $R_{L2}$ and $R_{L3}$ respectively.

Figure 10:
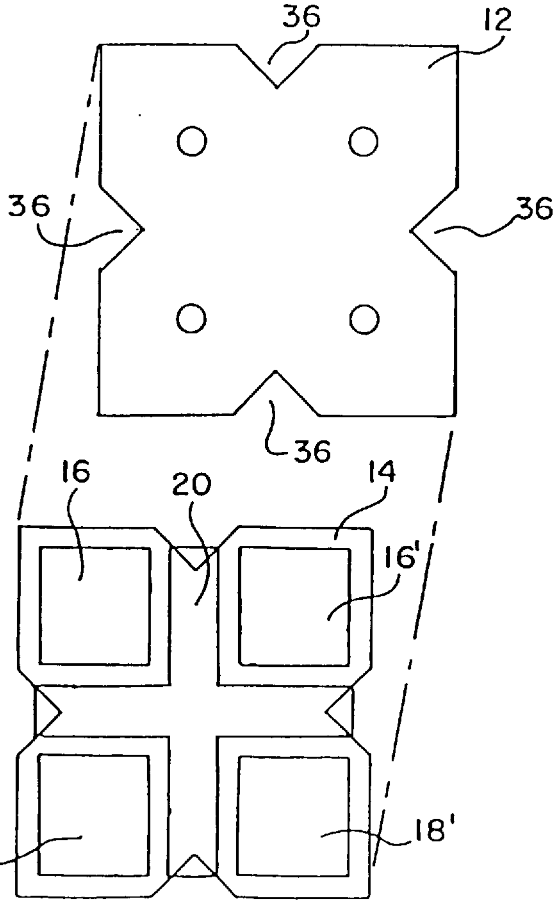
FIG. 10 is an exploded perspective view of another embodiment of an electrical apparatus according to the present invention.

FIG. 10 illustrates the apparatus 10 according to another embodiment of the present invention. The apparatus 10 includes PTC elements 16, 18, 16', 18', a single insulating body 20 and first 12 and second 14 conductive terminals. The insulating body 20 is cross-shaped and electrically separates the PTC elements from one another. The conductive terminals 12, 14 have corresponding portions 36 removed from all four sides of their respective peripheries. The conductive terminals 12, 14 are soldered to the PTC elements 16, 18, 16', 18' such that the removed portions 36 of the conductive terminals 12, 14 are adjacent to portions of the insulating body 20. In this embodiment, the apparatus 10 is symmetrical and electrical contact can be made from the top, bottom or either side of the apparatus 10.

Figure 10A:
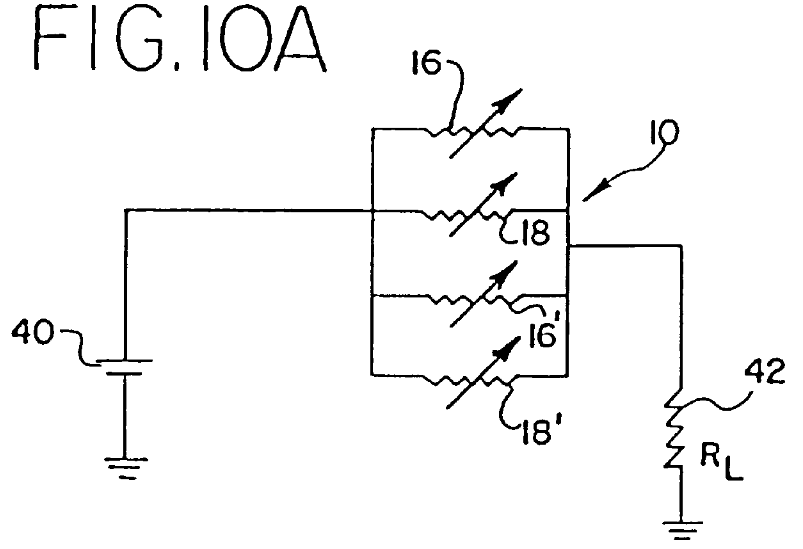
FIG. 10A is a schematic diagram of an electrical circuit comprising the electrical apparatus illustrated in FIG. 10.

FIG. 10A schematically illustrates the use of the apparatus 10 illustrated in FIG. 10 in an electrical circuit comprising a power source 40 and a resistive load 42. The apparatus 10 provides overcurrent protection to a single circuit having a resistive load $R_L$.

Figure 11:
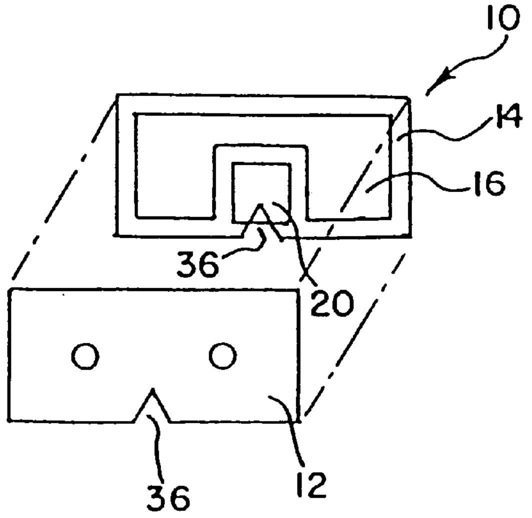
FIG. 11 is an exploded perspective view of another embodiment of an electrical apparatus according to the present invention.
Figure 12:
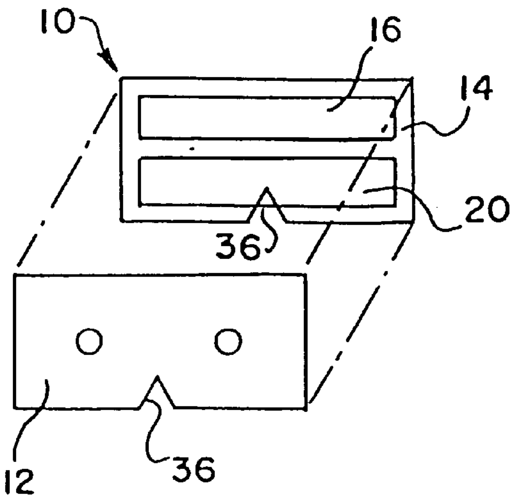
FIG. 12 is an exploded perspective view of a final embodiment of an electrical apparatus according to the present invention.

The present invention also contemplates an electrical apparatus with a single PTC element. With reference to FIGS. 11 and 12, the apparatus 10 comprises a single PTC element 16, insulating body 20, and first 12 and second 14 conductive terminals. The PTC element 16 is in electrical contact with the conductive terminals 12, 14. To facilitate insertion of the apparatus 10 between flexible conductive members (not shown in FIGS. 11 and 12), the conductive terminals 12, 14 have corresponding portions 36 of their peripheries removed. The PTC element 16 and the insulating body 20 are positioned between the conductive terminals 12, 14 so that body 20 is adjacent the removed portions 36 of the terminals 12, 14.

Figure 13:
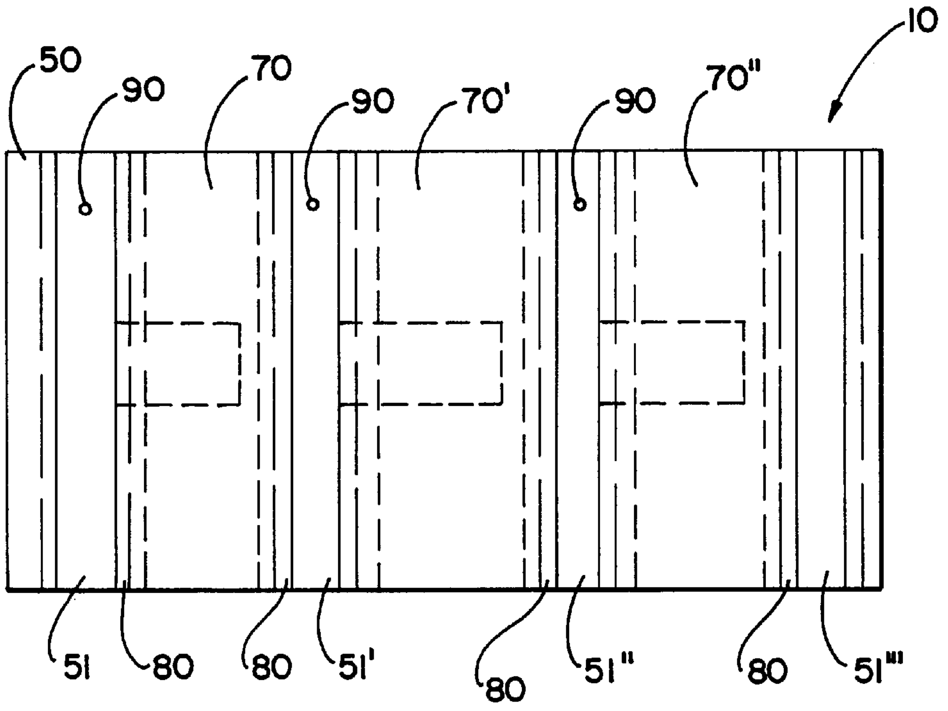
FIG. 13 is a plan view of one embodiment of an electrical circuit protection device according to the present invention.
Figure 14:
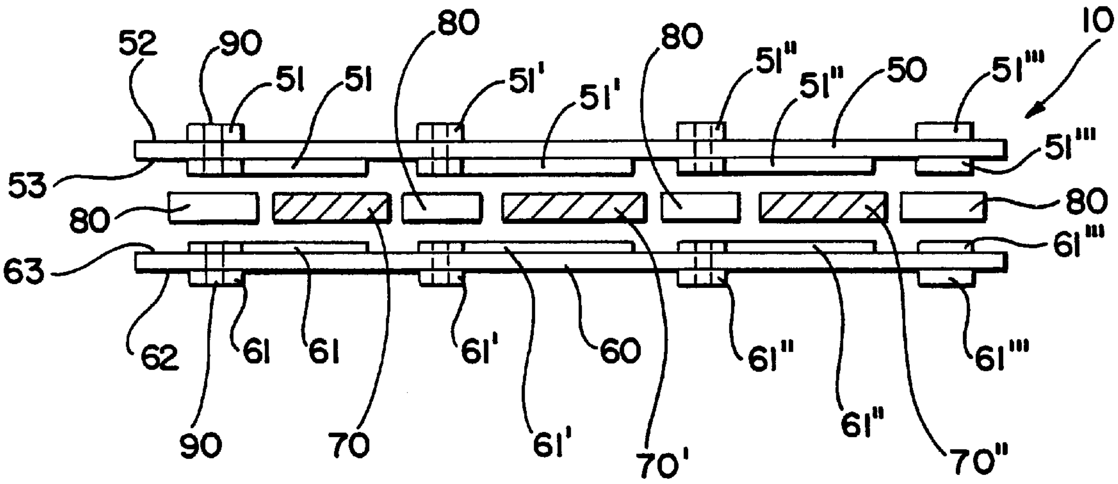
FIG. 14 is a front view of the electrical circuit protection device illustrated in FIG. 13.

Referring now to FIGS. 13–14, a preferred embodiment of the electrical circuit protection device of the present invention is illustrated. In this preferred embodiment, the device 10 comprises first and second electrically insulating substrates 50,60. A plurality of first conductive terminals 51,51',51" etc. are disposed on the first substrate 50, while a plurality of second conductive terminals 61,61',61" etc. are disposed on the second substrate 60. A plurality of PTC elements 70,70',70" etc. are disposed between the first and second substrates 50,60 and electrically connect first and second conductive terminals, respectively. A plurality of insulating bodies 80are also disposed between the substrates 50,60 and are positioned such that when the device 10 is electrically connected between flexible conductive members (as shown in FIG. 4), the flexible members exert a force upon at least one of the insulating bodies 80. The device 10 illustrated in FIGS. 13–14 provide electrical protection to three separate circuits. Accordingly, the PTC elements 70,70',70" are electrically and physically insulated from one another by the insulating bodies 80. As shown, the conductive terminals are disposed on both the inner 53,63 and outer surfaces 52,62 of the substrates 50,60, respectively. Electrical current flows along the conductive terminal from one surface of the substrate to the other surface of the substrate via through-holes 90 having a conductive material connecting terminal. For example, conductive terminal 51 is disposed on both surfaces 52,53 of substrate 50 with the portion of the terminal disposed on surface 52 electrically connected to the portion disposed on surface 53 via conductive material in through-hole 90. An exploded perspective view of the device 10 illustrated in FIGS. 13–14 is shown in FIG. 15. Referring to FIG. 15A, the device 10 disclosed in FIGS. 13–15 provides overcurrent protection to three electrical circuits having resistive loads $R_{L1}$, $R_{L2}$, $R_{L3}$, respectively.

The electrically insulating substrates 50,60 may be formed of any electrically insulating material (e.g., polyimide, ceramic), however, in a preferred embodiment the substrates are composed of FR-4 epoxy. The conductive terminals are comprised of a metal (preferably copper) and may be applied to the substrates 50,60 by any commonly known deposition techniques: e.g., plating (electroless or electrolytic), vapor deposition, or sputtering. Alternatively, the substrates 50,60 may comprise a copper clad FR-4 epoxy sheet (available from Allied Signal Laminate Systems, Hoosick Falls, N.Y., as Part No. 0200BED130C1/C1GFN0200 C1/C1A2C). In this embodiment, the conductive terminals 51,52 are preferably formed using a photolithographic etching process disclosed in U.S. patent application No. 08/982,589, the disclosure of which is fully incorporated herein by reference. The insulating bodies 80 are comprised of an electrically insulating material: e.g., FR-4 epoxy, polyimide, ceramic, photoresist material, dielectric material.

Figure 16:
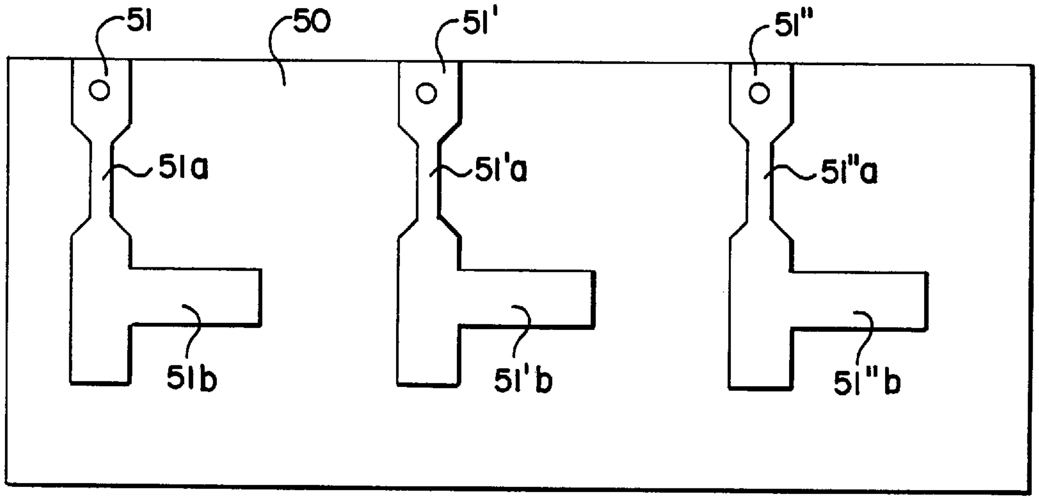
FIG. 16 illustrates one embodiment of a conductive terminal layout according to the present invention.
Figure 17:
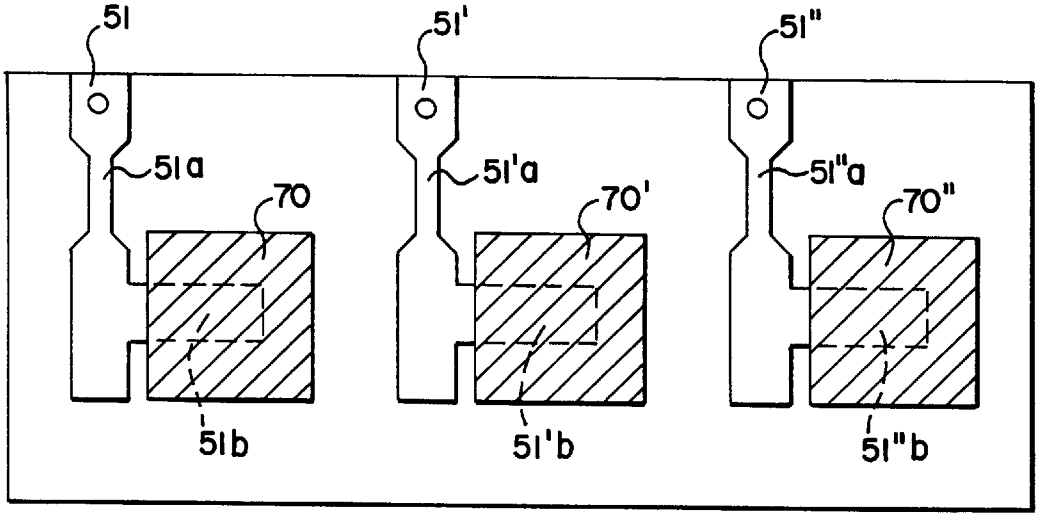
FIG. 17 illustrates PTC elements electrically connected to the conductive terminals illustrated in FIG. 16.

Referring to FIGS. 16 and 17, there is disclosed an alternative configuration of the conductive terminals 51,51', 51" on substrate 50. A portion of each terminal defines a fusible element **51*a*,51'*a*,51"*a* and a connector portion 51*b*, 51'*b*,51"*b*. When assembling the device 10, the PTC elements are placed over the connector portions 51*b*,51'*b*,51"*b* of the terminals such that the fusible elements 51*a*,51'*a*,51"*a* are electrically connected in series with the corresponding PTC element. The insulator bodies 80 (not shown) may take any shape and are positioned to electrically isolate the PTC elements 70.70',70" from one another and isolate the first and second conductive terminals (e.g., 51,61) from one another. In the final assembly of the device 10, the second substrate 60 having a conductive terminal layout similar to that shown in FIG. 15 (i.e., without the fusible element portions) is placed over the first substrate so that the conductive terminals 61,61'61" are in electrical contact with the PTC elements 70,70'70"**.

FIG. 18 illustrates the device 10 according to another embodiment of the present invention. In this embodiment, at least two of the plurality of PTC elements 70,70',70" are electrically connected in parallel. This may be accomplished by electrically connecting at least two (51,51' and 61,61') of the plurality of first and second conductive terminals to form essentially common first and second conductive terminals (as shown in FIG. 18) and in turn electrically connecting at least two PTC elements 70,70', or by merely electrically connecting at least two PTC elements to a first and a second conductive terminal (not shown). The PTC elements 70,70' electrically connected in parallel are physically separated from one another by insulating bodies 80. In the embodiment illustrated in FIG. 18, the first conductive terminal 51' is not electrically connected from one surface 52 to the other surface 53 of substrate 50. Likewise, the second conductive terminal 61' is not electrically connected from one surface 62 to the other surface 63 of substrate 60. This ensures that current will flow from conductive terminal 51 through PTC elements 70,70' to conductive terminal 61, rather than from conductive terminal 51 to conductive terminal 51', bypassing the PTC elements.

Depending on the desired application, the resistance of the PTC elements electrically connected in parallel may be the same or different. For example, the resistance $R_1$ of the first PTC element 70 connected in parallel can be approximately equal to the resistance $R_2$ of the second PTC element 70' connected in parallel. Alternatively, $R_1$ may be greater than $R_2$. Referring to FIG. 18A, the device 10 disclosed in FIG. 18 provides overcurrent protection to two electrical circuits having resistive loads $R_{L1}$ and $R_{L2}$, respectively.

Figure 19:
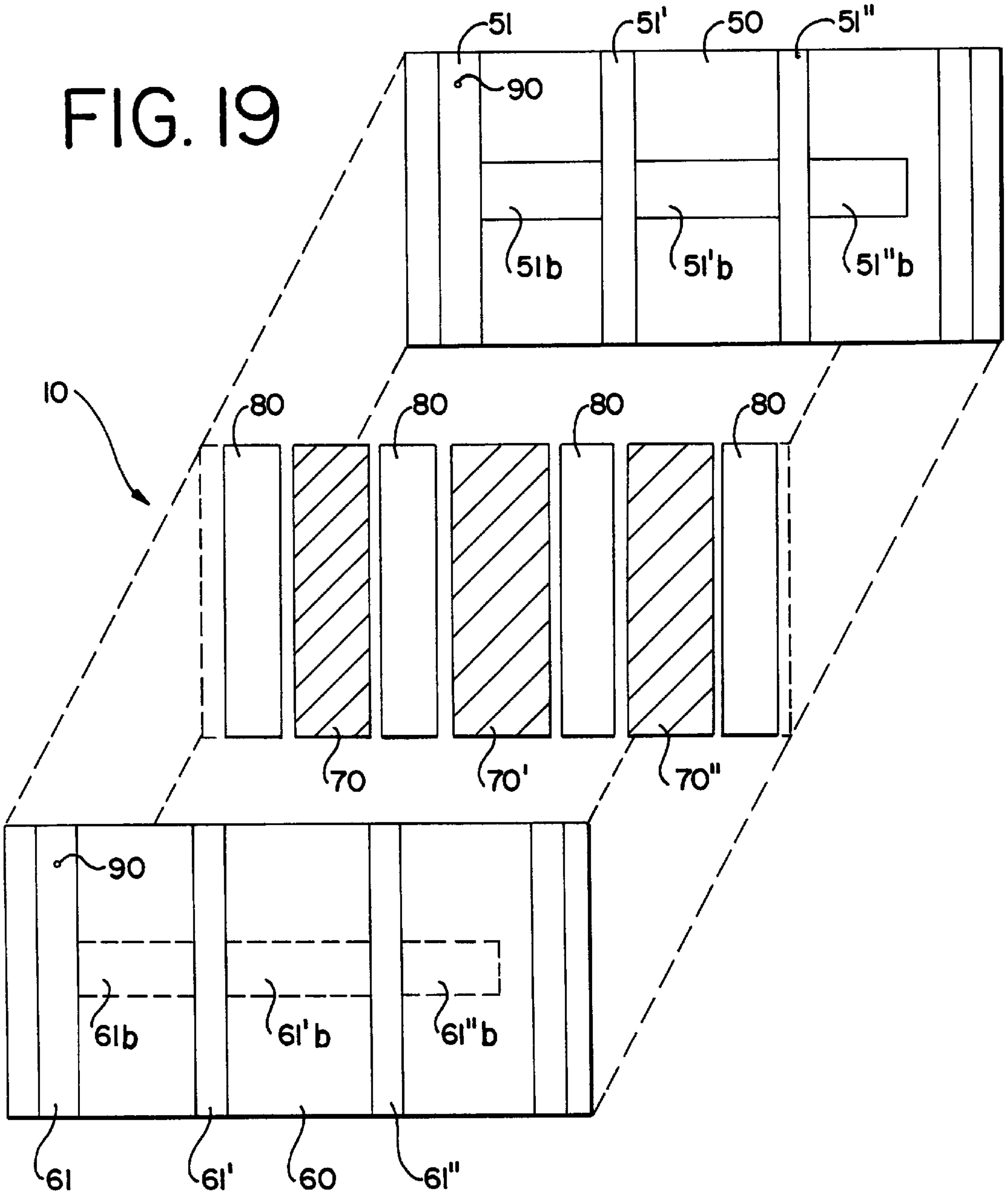
FIG. 19 is an exploded perspective view of an electrical circuit protection device according to a third embodiment of the present invention.
Figure 19A:
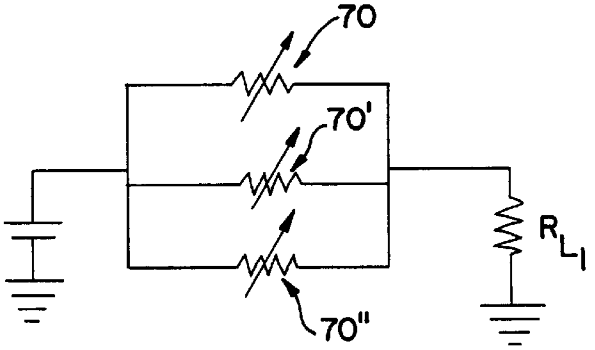
FIG. 19A is a electrical schematic diagram of the device illustrated in FIG. 19.

In another embodiment of the present invention illustrated in FIG. 19, three PTC elements 70,70',70" are electrically connected in parallel to increase the electrical rating of the device 10. As shown in FIG. 19A, the device 10 disclosed in FIG. 19 provides overcurrent protection to a single electrical circuit having a resistive load $R_{L1}$.

It will be understood that in the embodiments illustrated in FIGS. 18–19 a portion of the either the first conductive terminal 51 or the second conductive terminal 61 may define a fusible element (**51*a* or 61*a*) as disclosed in FIGS. 16–17** to provide fusible protection to a circuit having two or more PTC elements electrically connected in parallel. It should also be understood that the number and configuration of the conductive terminals disposed on the substrates is limited only by the size and shape of the substrate utilized. Finally, it will be understood that the present invention may be embodied in other specific forms without departing from the spirit or central characteristics thereof. The present embodiment, therefore, is to be considered in all respects as illustrative and not restrictive, and the invention is not to be limited to the details given herein.

What we claim is:

1. An electrical circuit protection device making an electrical connection between flexible conductive members, the device comprising:

a first electrically insulating substrate having a first conductive terminal disposed thereon;

a second electrically insulating substrate having a second conductive terminal disposed thereon;

a PTC element positioned between the first and second substrates and electrically connecting the first conductive terminal to the second conductive terminal;

an insulating body positioned between the first and second substrates such that the flexible conductive members exert a force upon the insulating body, said force is greater then a force the flexible members exert upon the PTC element.

2. The circuit protection device of claim 1 wherein the PTC element comprises a polymer composition having conductive particles dispersed therein.

3. The circuit protection device of claim 2 wherein the composition comprises a polymer selected from the group consisting of polyethylene, polypropylene, copolymers of polyethylene and ethylene/propylene copolymers.

4. The circuit protection device of claim 2 wherein the conductive particles comprise carbon black.

5. The circuit protection device of claim 2 wherein the PTC element further comprises first and second electrodes.

6. The circuit protection device of claim 1 wherein the conductive terminals are comprised of a metal.

7. The circuit protection device of claim 1 wherein either a portion of the first conductive terminal or a portion of the second conductive terminal defines a fusible element electrically connected in series with the PTC element.

8. The circuit protection device of claim 1 wherein the insulating substrates have a first and a second surface, the first and second conductive terminals being disposed on the first and second surfaces of the insulating substrates, respectively.

9. The circuit protection device of claim 8 wherein the conductive terminal disposed on the first surface of the substrate is electrically connected to the conductive terminal disposed on the second surface of the substrate by way of a through-hole.

10. An electrical circuit protection device making an electrical connection between flexible conductive members, the device comprising:

a first electrically insulating substrate having a plurality of first conductive terminals disposed thereon;

a second electrically insulating substrate having a corresponding plurality of second conductive terminals disposed thereon;

a plurality of PTC elements positioned between the first and second substrates, each PTC element electrically connected to a first and second conductive terminal, respectively;

a plurality of insulating bodies disposed between the first and second substrates and positioned such that the flexible conductive members exert a force upon at least one of the plurality of insulating bodies, said force is greater then a force the flexible members exert upon at least one of the plurality of PTC elements.

11. The electrical device of claim 10 wherein a portion of either the first or the second conductive terminal defines a fusible element, the fusible element being electrically connected in series with one of the plurality of PTC elements.

12. The electrical device of claim 10 wherein at least two of the plurality of PTC elements are electrically connected in parallel.

13. The electrical device of claim 12 wherein the first of the at least two of the plurality of PTC elements has a resistance $R_1$ at approximately 25° C. and the second of the at least two of the plurality of PTC elements has a resistance $R_2$ at approximately 25° C., $R_1$ being approximately equal to $R_2$.

14. The electrical device of claim 12 wherein the first of the at least two of the plurality of PTC elements has a resistance $R_1$ at approximately 25° C. and the second of the at least two of the plurality of PTC elements has a resistance $R_2$ at approximately 25° C., $R_1$ being greater than $R_2$.

15. An electrical circuit protection device for making an electrical connection between flexible conductive members, the device comprising:

a first electrically insulating substrate having a plurality of first conductive terminals disposed thereon, a portion of each first conductive terminal defining a fusible element;

a second electrically insulating substrate having a plurality of second conductive terminals disposed thereon;

a plurality of PTC elements disposed between the insulating substrates, each PTC element being composed of a conductive polymer composition and being electrically connected to one of the plurality of first conductive terminals and to one of the plurality of second conductive terminals such that each PTC element is electrically connected in series with the portion of each first conductive terminal defining a fusible element, respectively; and a plurality of insulating bodies disposed between the first and second substrates and positioned such that when the device is electrically connected between the flexible conductive members, the flexible members exert a force upon at least one of the plurality of insulating bodies.

* * * * *